United States Patent
Merlo et al.

(10) Patent No.: US 7,580,964 B2
(45) Date of Patent: Aug. 25, 2009

(54) HARDWARE-EFFICIENT PHASE-TO-AMPLITUDE MAPPING DESIGN FOR DIRECT DIGITAL FREQUENCY SYNTHESIZERS

(75) Inventors: Edward T. Merlo, Marina del Rey, CA (US); Kwang-Hyun Baek, Thousand Oaks, CA (US); Myung-Jun Choe, Thousand Oaks, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 743 days.

(21) Appl. No.: 11/339,933

(22) Filed: Jan. 25, 2006

(65) Prior Publication Data

US 2007/0174371 A1    Jul. 26, 2007

(51) Int. Cl.
*G06F 1/02*    (2006.01)
(52) U.S. Cl. ........................ 708/276; 327/105
(58) Field of Classification Search ................. 708/276, 708/271; 327/105–106
See application file for complete search history.

(56) References Cited

U.S. PATENT DOCUMENTS

| | | | | |
|---|---|---|---|---|
| 5,113,361 A | * | 5/1992 | Damerow et al. | 708/276 |
| 5,224,064 A | * | 6/1993 | Henry et al. | 708/440 |
| 5,276,633 A | * | 1/1994 | Fox et al. | 708/276 |
| 5,900,570 A | * | 5/1999 | Rossum | 84/653 |
| 6,657,573 B2 | | 12/2003 | Langlois et al. | |
| 2002/0184274 A1 | * | 12/2002 | Shipley | 708/276 |

OTHER PUBLICATIONS

B.D. Yang et al., IEEE J. Solid State Circuits, vol. 39, No. 5, pp. 761-774, 2004.

A. Edman et al., Symposium on VLSI Circuits Digest of Technical Papers, pp. 54-55, Jun. 1998.

* cited by examiner

*Primary Examiner*—Tan V Mai
(74) *Attorney, Agent, or Firm*—Eric A. Gifford (57) ABSTRACT

A hardware-efficient mapping circuit uses a base decoder to decode the control signal (the most significant bits "MSBs" of the phase angle) to provide a base value. A controller maps the control signal to a segment number to down select signed shift values from the control signal. Shifter blocks shift the data signal (the least significant bits "LSBs" of the phase angle) by the respective shift values. The shifted data signals are added/subtracted from the base value to approximate a sinusoidal amplitude for the phase angle. Down selection by a controller allows the shifter blocks to be implemented with narrow band multiplexers, which conserves both chip space and power.

23 Claims, 7 Drawing Sheets

| SEGMENT | T TERM1 | T TERM2 | T TERM3 | T TERM4 |
|---|---|---|---|---|
| 1 | + SHIFT 0 (>>0) | + SHIFT 1 (>>1) | + SHIFT 4 (>>4) | + SHIFT 6 (>>6) |
| 2 | + SHIFT 0 (>>0) | + SHIFT 1 (>>1) | + SHIFT 4 (>>4) | + 0 |
| 3 | + SHIFT 0 (>>0) | + SHIFT 1 (>>1) | + SHIFT 4 (>>4) | + 0 |
| 4 | + SHIFT 0 (>>0) | + SHIFT 1 (>>1) | + SHIFT 4 (>>4) | - SHIFT 6 (>>6) |
| 5 | + SHIFT 0 (>>0) | + SHIFT 1 (>>1) | + SHIFT 5 (>>5) |  |
| 6 | + SHIFT 0 (>>0) | + SHIFT 1 (>>1) | + 0 | + SHIFT 6 (>>6) |
| 7 | + SHIFT 0 (>>0) | + SHIFT 1 (>>1) | + 0 | + 0 |
| 8 | + SHIFT 0 (>>0) | + SHIFT 1 (>>1) | - SHIFT 5 (>>5) | + 0 |
| 9 | + SHIFT 0 (>>0) | + SHIFT 1 (>>1) | - SHIFT 4 (>>4) | + 0 |
| 10 | + SHIFT 0 (>>0) | + SHIFT 1 (>>1) | - SHIFT 4 (>>4) | - SHIFT 5 (>>5) |
| 11 | + SHIFT 0 (>>0) | + SHIFT 1 (>>1) | - SHIFT 3 (>>3) | - SHIFT 6 (>>6) |
| 12 | + SHIFT 0 (>>0) | + SHIFT 2 (>>2) | + SHIFT 4 (>>4) | + SHIFT 6 (>>6) |
| 13 | + SHIFT 0 (>>0) | + SHIFT 2 (>>2) | + SHIFT 5 (>>5) | + 0 |
| 14 | + SHIFT 0 (>>0) | + SHIFT 2 (>>2) | + 0 | - SHIFT 6 (>>6) |
| 15 | + SHIFT 0 (>>0) | + SHIFT 2 (>>2) | - SHIFT 4 (>>4) | + 0 |
| 16 | + SHIFT 0 (>>0) | + SHIFT 2 (>>2) | - SHIFT 3 (>>3) | + SHIFT 6 (>>6) |
| 17 | + SHIFT 0 (>>0) | + SHIFT 4 (>>4) | + 0 | + SHIFT 6 (>>6) |
| 18 | + SHIFT 0 (>>0) | + 0 | + SHIFT 5 (>>5) | + 0 |
| 19 | + SHIFT 0 (>>0) | + 0 | - SHIFT 5 (>>5) | + 0 |
| 20 | + SHIFT 0 (>>0) | + 0 | - SHIFT 3 (>>3) | + SHIFT 6 (>>6) |
| 21 | + SHIFT 1 (>>1) | + SHIFT 2 (>>2) | + SHIFT 4 (>>4) | - SHIFT 5 (>>5) |
| 22 | + SHIFT 1 (>>1) | + SHIFT 2 (>>2) | + SHIFT 5 (>>5) | + 0 |
| 23 | + SHIFT 1 (>>1) | + SHIFT 2 (>>2) | + SHIFT 5 (>>5) | - SHIFT 6 (>>6) |
| 24 | + SHIFT 1 (>>1) | + SHIFT 2 (>>2) | - SHIFT 3 (>>3) | + 0 |
| 25 | + SHIFT 1 (>>1) | + SHIFT 4 (>>4) | + 0 | + SHIFT 6 (>>6) |
| 26 | + SHIFT 1 (>>1) | + 0 | + 0 | - SHIFT 6 (>>6) |
| 27 | + SHIFT 1 (>>1) | + 0 | - SHIFT 4 (>>4) | - SHIFT 6 (>>6) |
| 28 | + SHIFT 3 (>>3) | + SHIFT 2 (>>2) | + 0 | - SHIFT 5 (>>5) |
| 29 | + 0 | + SHIFT 2 (>>2) | + SHIFT 5 (>>5) | - SHIFT 6 (>>6) |
| 30 | + 0 | + SHIFT 2 (>>2) | - SHIFT 4 (>>4) | + SHIFT 6 (>>6) |
| 31 | + SHIFT 3 (>>3) | + 0 | + 0 | - SHIFT 6 (>>6) |
| 32 | + 0 | + 0 | + SHIFT 5 (>>5) | + 0 |

+ : ADDITION, - : SUBTRACTION

HARDWARE-EFFICIENT PHASE-TO-AMPLITUDE MAPPING DESIGN FOR DIRECT DIGITAL FREQUENCY SYNTHESIZERS

BACKGROUND OF THE INVENTION

1. Field of the Invention

This invention relates to a direct digital frequency synthesizer (DDFS) and more specifically to a hardware-efficient phase-to-amplitude mapping design.

2. Description of the Related Art

Direct digital frequency synthesizers (DDFS) are becoming an alternative to analog-based PLL synthesizers in systems exemplified by chirp radar, frequency agile radio, agile clock synthesis, phase array antennas and automatic test equipment because of sub-Hertz resolution and fast frequency switching properties. To exploit DDFS in broadband communication systems, DDFS designs operating at GHz-range clock frequencies are required. However, most DDFS designs are working up to a few hundred MHz-range frequencies. B. D. Yang et al recently published results for a single-chip DDFS design with an integrated DAC working at 800 MHz clock frequency ($f_{CLK}$) having 55 dBc spurious-free dynamic range (SFDR) at low synthesized output frequencies ($f_{OUT}$) (IEEE J. Solid State Circuits, vol. 39, no. 5, pp. 761-774, 2004). Note however that SFDR drops to below 25 dBc at $f_{OUT}$ CLose to 400 MHz, which is not suitable for high-spectral purity communication systems.

Figure 1:
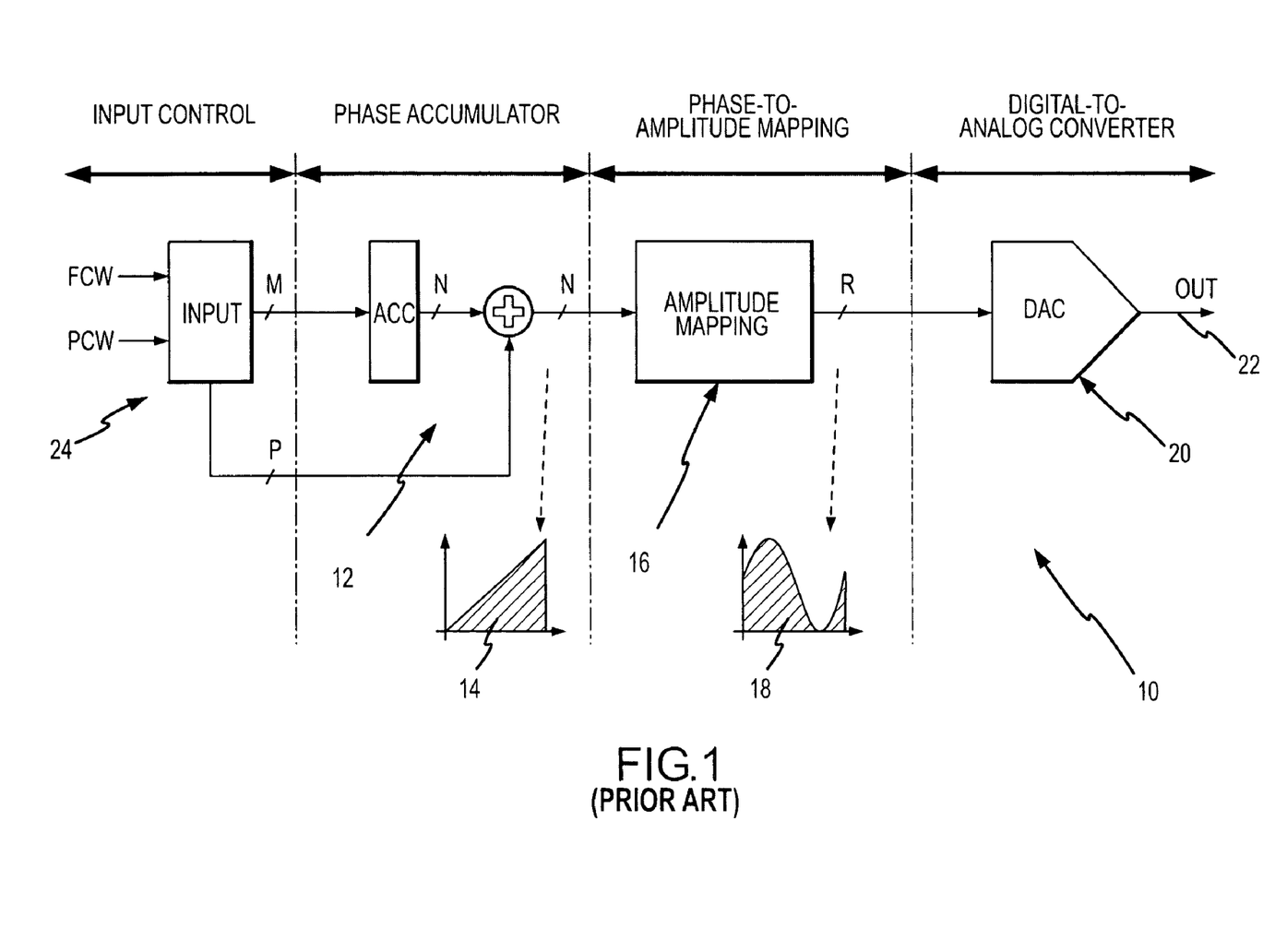
FIG. 1, as described above, is a block diagram of a direct digital frequency synthesizer (DDFS)

As shown in FIG. 1, the basic principle of a DDFS 10 involves the use of a phase accumulator 12 to calculate phase angles around the unit cirCLe. Phase accumulator 12 provides a certain frequency tuning resolution when clocked at a given frequency, desirably sub-Hertz resolution at GHz frequencies. The M-bit phase angle 14 is truncated to N bits and passed to a phase-to-amplitude mapping circuit 16, which together with the phase accumulator make up the numerically controlled oscillator (NCO), to generate the corresponding R-bit sinusoid amplitude samples 18. These samples are passed to a digital-to-analog converter (DAC) 20 then filtered by a low-pass filter to generate the synthesized analog signal 22. Input control circuit 24 controls the output frequency and/or phase by providing P-bit frequency control words (FCW) or phase control words (PCW) to the phase accumulator depending on a 'Mode' to change output frequency or modulate phase. The phase accumulator integrates the control word every clock cycle and overflows through zero periodically resulting in a repeating ramp output.

Many architectures and design attempts have been reported in literature for the phase-to-amplitude mapping circuit 16 in DDFS. ROM-based mappings include uncompressed, Sunderland architecture and Nicholas architecture. Computation mappings include CORDIC and other angular rotation algorithms and parabolic, polynomial and linear approximation. This circuit is the most challenging unit among the digital parts of DDFS, because it usually limits operating speed, requires a large area, and consumes more power than any other circuits.

Figure 2A:
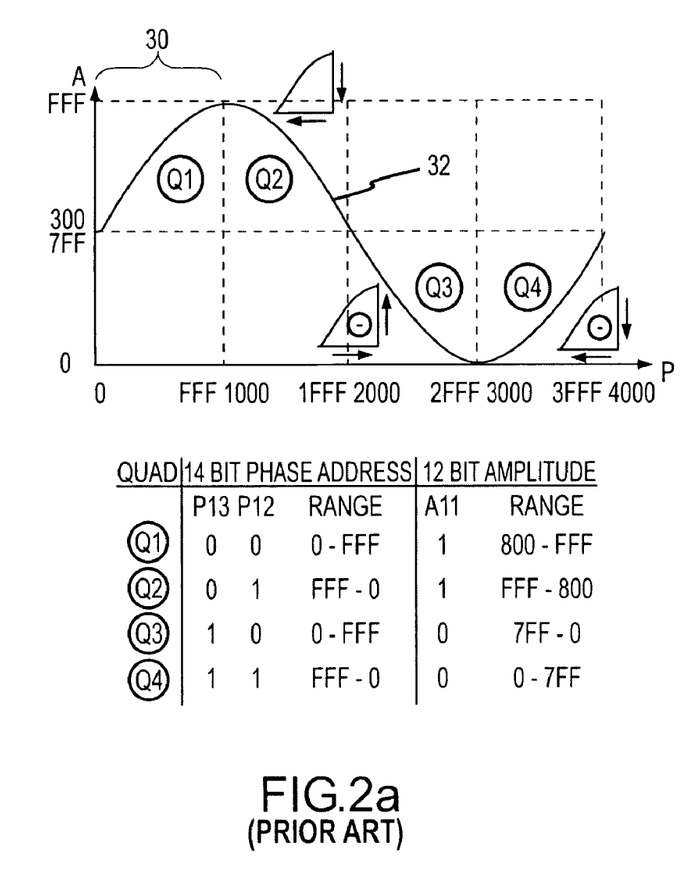
FIGS. 2a and 2b, as describe above, are diagrams illustrating the linear approximation method for phase-to-amplitude mapping.
Figure 2B:
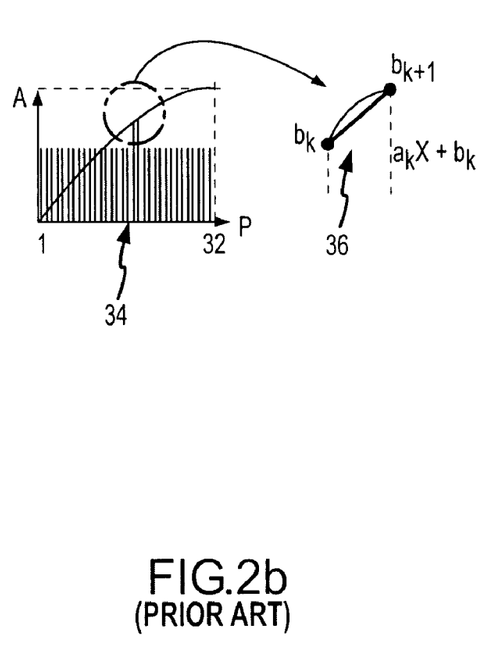

Linear approximation is one of the simplest computational ways to convert phase data to sine amplitude. As shown in FIGS. 2a and 2b, one quarter period 30 of sine wave 32 is divided into a number of segments 34 (N) and within those segments the sine amplitude 36 is computed with a linear function, Y=aX +b. Each linear function has a starting value of $b_k$ and an ending point at $b_{(k+1)}$ with a slope coefficient '$a_k$', 0<k<N. N is dictated by the design goals, such as SFDR. A certain number of the MSBs of the R-bit mapping input are used to decode the segment number giving $b_k$ and $b_{(k+1)}$ and the remaining LSBs are used to compute an intermediate point $a_k X$ on the linear segment between $b_k$ and $b_{(k+1)}$.

U.S. Pat. No. 6,657,573 to Langlois et al. describes an implementation of a phase-to-sinusoid amplitude conversion system using linear approximation in which each linear segment is defined with a lower horizontal-axis bound; a lower vertical-axis bound; and a slope represented as a sum of a plurality of slope elements. Based on the approximation and for a given phase angle a set of values are evaluated, for each linear line segment, representing a product of (i) a horizontal displacement representing a difference between the prescribed phase angle and the lower horizontal-axis bound $x_i$ of a selected linear line segment where, for example, $x_i<X<x_{i+1}$ and (ii) each one of the slope elements of the selected linear line segment. The approximation of the sinusoidal amplitude is then obtained by adding one of the sets of values determined above with the lower vertical-axis bound of the selected linear line segment.

As shown in Langlois' FIG. 4, the addend generator/selector module receives two signals: the control signal that is log2(S) bits wide and the data signal that is W-$\log_2$(S) bits wide where S is the number of linear segments. The control signal is used to select appropriate input ports from (P+1) multiplexers each having S input ports where P represents the number of powers of two that are summed to equate one slope coefficient. The input ports of the first P multiplexers are provided with output from shift/sign inversion (SI) block mechanisms. Each SI block includes a shifter block and a +/−1 multiplier. The number of the shift position imposed on the data signal depends on the portion of a slope $m_i$ that is calculated by the shifter block (i.e., the block is responsible for the multiplication by a single power of two, which is performed in binary by a simple shift). The +/−1 multiplier inverts the sign of the shifted data, if necessary, as defined by the relevant segment slope. The input ports of the multiplexer (P+1) are provided with constant values provided by a plurality of constant data (CD) blocks, each providing a digital word that represents a segment's lower vertical axis limit $y_i$, which are selected to maximize the output spectral purity of the DDFS. The outputs from the multiplexers are processed by the adder module.

Although an advancement over traditional architectures that rely on look-up tables and multipliers, Langlois' addend generator/selector module uses multiple multiplexers that are S bits wide. Langlois hardwires the shifting of the data signal to the inputs of each multiplexer and then uses the control signal to select the input that corresponds to the segment number. Typical, converters divide quadrants into S=32 segments or larger, which means this approach would require multiple 32-bit or wider multiplexers. These wideband multiplexers use considerable hardware resources, thus requiring considerable area and consuming significant amounts of power.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining Claims that are presented later.

The present invention provides a hardware-efficient phase-to-amplitude mapping that reduces the amount of hardware resources, thus requiring smaller area, consuming less power, and achieving higher throughput with an easy pipeline design.

This is accomplished using linear approximation in which each linear segment is defined by a base value and a slope represented as a sum of slope elements. A base decoder decodes the control signal (the most significant bits "MSBs" of the phase angle) to provide a base value. A controller maps the control signal to a segment number to select at least one shift value (slope element) and it's +/−1 multiplier (SIGN) from respective sets of preset values for the specified segment. At least one shifter block shifts the data signal (the least significant bits "LSBs" of the phase angle) by the selected shift value(s). An adder adds/subtracts the shifted data signal (s) to the base value to produce an approximate sinusoidal amplitude for the phase angle. The number of shifter blocks and number of preset shift values in each shifter block set will depend on the system requirements for the mapping. Because the shifter blocks shift the data signal by values selected by the controller instead of hardwiring all combinations of shift values for all possible segments, each shifter can be implemented without wideband multiplexers, and thus requires less area and consumes less power.

The value of using a controller to down select from a segment number to a particular shift value, and further to down select to a particular shift value from a constrained set of values is found in the preferred implementation of the shifter blocks. In the preferred embodiment, each shifter block comprises a plurality of multiplexers (one for each LSB) in which each input port corresponds to a different shift value. The multiplexers are configured to receive the remaining LSBs at their input ports down shifted from one multiplexer to the next to receive bit 6, bit 5 and so forth to bit 0 and, in response to a select signal from the controller, to pass the down shifted LSB at the selected input port to an output port. Each multiplexer selects a different lsb shifted by the same shift value so that together the multiplexers pass the remaining LSBs right shifted by the shift value associated with the selected input port. The number of input ports of the multiplexers is dictated by the number of preset shift values required to accurately map all of the segments to meet system requirements. For example, 4-port or 8-port multiplexers may be used to implement the shifters for use in a 32, 64 or higher segment phase-to-amplitude converter.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a table of signed shift values for a 32-segment, 4-shifter block, 4-port multiplexer implementation;

DETAILED DESCRIPTION OF THE INVENTION

The present invention provides a hardware-efficient phase-to-amplitude mapping based on a linear approximation method that reduces the amount of hardware resources, thus requiring smaller area, consuming less power, and achieving higher throughput with an easy pipeline design.

Similar to Langlois, the current PAM circuit represents the slope as a sum of a plurality of slope elements where each element represents a shift by a different power of two, e.g. 1, ½, ¼, etc. Unlike Langlois, the current PAM circuit employs a controller to down select a shift value for a particular segment. Consequently, the number of multiplexer input ports is dependent on the number of shift values for a given shifter block, not the number of segments. To further simplify the hardware (narrower multiplexers), the unused or rarely used shift values are eliminated. For example, for a 32-segment, 7 LSB input, Langlois would require multiple 32 port (32:1) multiplexers whereas the current PAM would at most require 8 port (8:1) multiplexer (the $1^{st}$ power of two at least equal to the number of LSBs plus one). Furthermore, the current PAM could be implemented with 4 port (4:1) or even 2 port (2:1) multiplexers.

Figure 3:
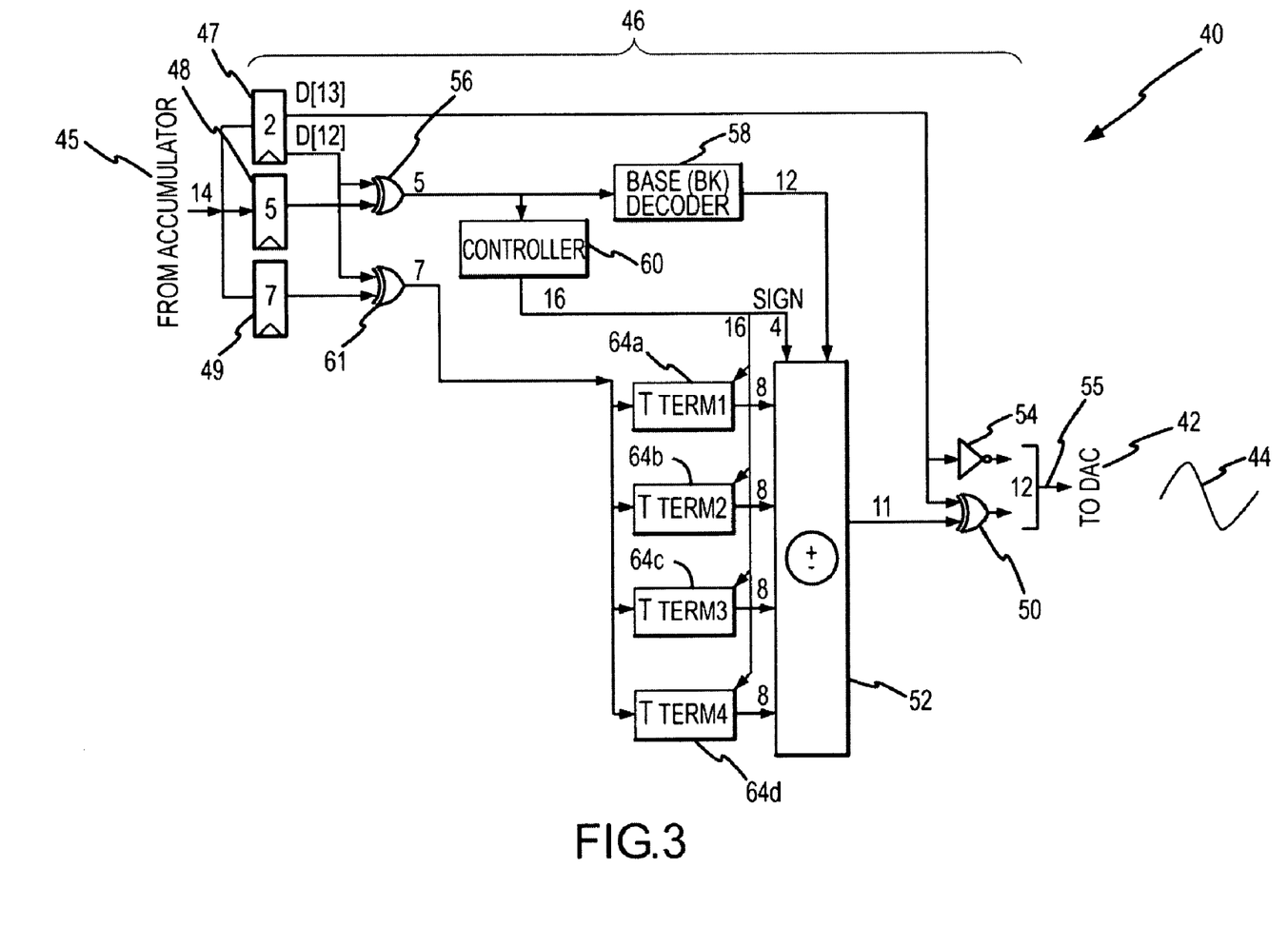
FIG. 3 is a block diagram of a linear approximation phase-to-amplitude mapping circuit in accordance with the present invention.

As shown in FIG. 3, a DDFS 40 includes a NCO that generates R-bit sinusoidal amplitude samples using linear approximation ($Y=a_k X + b_k$) and a DAC 42 that converts the digital samples to analog values to synthesize an analog signal 44. The NCO includes a phase accumulator 45 that calculates phase angles around the unit circle. The phase angle is truncated to N bits and passed to a phase-to-amplitude mapping circuit 46 to generate the corresponding R-bit sinusoid amplitude samples. In this particular example, the phase angle is 14-bits of which the 2 MSBs (D(13), D(12)) are a quadrant signal 47, the next 5 MSBs (D(11)-D(7)) are a control signal 48 and the last 7 LSBs (D(6)-D(0)) are a data signal 49.

Quadrant compression is a common practice to reduce the amount of logic required to implement the mapping circuit. The mapping circuit is designed to map the first quadrant using the control and data signals into a 12-bit amplitude and translate that quadrant using the quadrant signal to the other three quadrants. The MSB D(13) is XOR'd 50 with the 11-bit approximate amplitude from adder 52 and provided through gate 54 as the $12^{th}$ and MSB of the 12-bit amplitude approximation 55 of the sinusoid. The $2^{nd}$ MSB D(12) is XOR'd 56 with the control signal and provided to both a base decoder 58 and a controller 60 and XOR'd 62 with the data signal and provided to each of at least one shifter blocks 64a, 64b, . . . 64d.

The mapping circuit must also compensate for any difference in the resolution of the X and Y axes, e.g. as shown in FIG. 2a X has twice the range of Y. The mapping circuit can handle this either directly in base decoder 58, controller 60 and shifter blocks 64a, 64b, . . . 64d or, as shown, by mapping the phase angle as if the relation was 1:1 and then dividing by 2 (right shift 1 bit) in adder 52 at the completion of the mapping. The latter approach is generally more accurate because it maintains higher resolution through the adder.

Base decoder 58 maps the 5 MSBs of the control signal into a 12-bit base value ($b_k$) of a sinusoidal amplitude. This can be done in a LUT or, preferably, in logic circuitry to facilitate a "pipeline" design of the entire mapping circuit. As will be discussed below in regards to FIG. 5, the base value for each segment is predetermined in accordance with a simulation that selects the base values ($b_k$) and slope elements ($a_k$) to satisfy certain system requirements, e.g. spur free dynamic range (SFDR) of the mapping circuit.

Controller 60 and shifter blocks 64a, 64b, . . . 64d together map the 7 LSBs of the data signal into a 7-bit value ($a_k X$) for the particular segment. The controller maps the control signal into at least one signed shift value (slope element), and in this example four, one for each shifter block. Each shifter block effectively multiplies the data signal X by a slope element by right shifting the 7 LSBs by the selected shift value to generate a Tterm value. Adder 52 adds/subtracts each of the shifted data signals to the base value and discards the 1 LSB for the X/Y scaling. This 11-bit value is XOR'd 50 with MSB D(13), which is also appended as the MSB to form the 12-bit approximate sinusoidal amplitude 55 that is forwarded to the DAC.

FIG. 4 is one example of a table 70 of signed shift values (slope elements) for each of the shifter blocks (SB1-SB4) for each segment. Each segment will have at least one shifter block and at most seven (the # of LSBs in the data signal). Each shifter block will have at least one possible shift value and at most eight (# of LSBs plus one). Note a "0" is equivalent to a shift 7 (>>7). The shift values (slope elements) are assigned so that the sum Closely approximates the ideal slope for each segment. The controller may be implemented as a LUT to map the segment number to the signed shift values for each shifter block. However, the controller is preferably implemented in digital logic to facilitate the desired "pipeline" design. Note, in the implementations described in FIGS. 6 and 7, the controller actually maps the control signal into select signals ($M_{SEL}$) that select specific input ports on each shifter block to select the corresponding shift values and a sign bit (SIGN).

A PAM circuit, in which the data signal is 7 LSBs, having 7 shifter blocks, each block having the full complement of shift values to choose from, would provide maximum resolution for calculating $a_k X$. However, in many applications the system requirements for the DDFS or NCO do not require this level of resolution. As such the number of shifter blocks may be reduced, and/or the number of shift values selectable by each shift block may be reduced and still satisfy the system requirements. The number of shift values (including "0") for each shift block is, for hardware purposes, preferably but not necessarily the same. As a result the amount of hardware resources and power consumption can be reduced. In this example, the PAM circuit includes four shifter blocks, each block having a set of four preset shift values that can be selected by the controller. For example, shifter block 64b (SB2) is capable of shifting the data signal by >>1, >>2, or >>4 or assigning "0". The controller decodes the control signal to pick the input port on the shifter block that corresponds to the appropriate shift value. For a given segment, say # 13, the four shifter blocks will shift the data signal by >>0, >>2, >>5 and assign a "0" value. This corresponds to a slope of 1+0.25+0.03125+0=1.28125. This value is then shifted >>1 by the adder for the X/Y scaling so the actual slope is 0.640625. The same result (or nearly the same result depending on internal rounding) would be produced by shifting the data signal by >>1, >>3, >>6 and assigning a "0" value with no subsequent shift.

The problem of determining the base values and the table of shift values (slope elements) for a particular application can be stated as follows: Given a number of MSBs and LSBs, find a number of shifter blocks and shift values for those blocks for each segment such that the performance (e.g. SFDR) of the mapping circuit meets a system requirement.

The problem can be further constrained by specifying (a) that the number of shifter blocks should not exceed a certain number and/or (b) the number of preset shift values supported by each shifter block should not exceed a certain number. These constraints assure that a solution is found (if possible) that conserves hardware resources and reduces power consumption. Determination of an optimum solution to this problem would require a sophisticated simulation capable of considering all of these variables simultaneously. A simpler approach that breaks the problem into sections has been demonstrated to find base values and the table of shift values that both meets system performance requirements and substantially reduces hardware resources.

Figure 5:
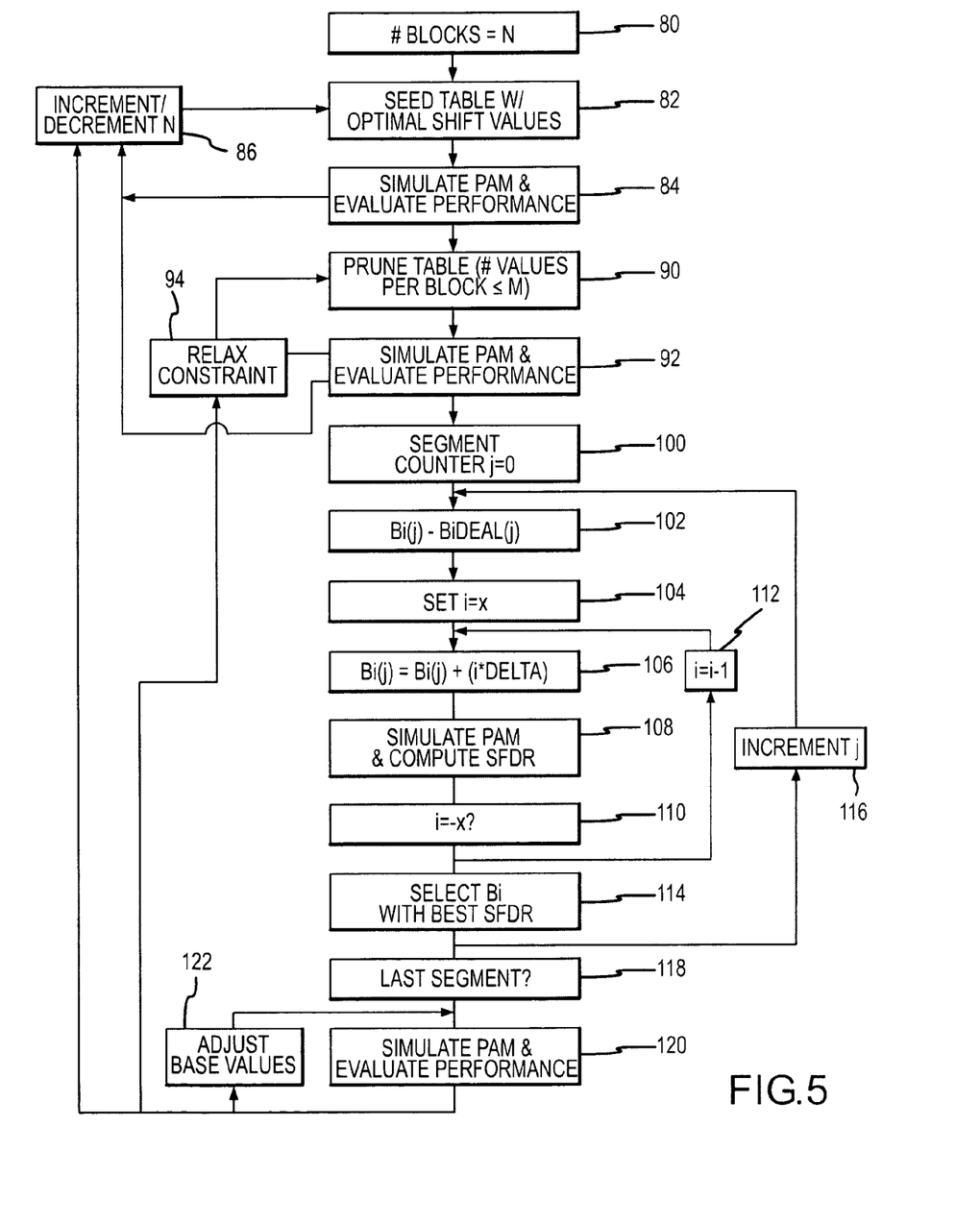
FIG. 5 is a flow diagram for generating the base values and the table of shift values.

As shown in FIG. 5, an exemplary embodiment of a simulation breaks the problem into three stages: (1) determine a number of shifter blocks (assuming ideal base values & unconstrained number of shift values) that meet system requirements, (2) for the determined number of shifter blocks (assuming ideal base values), determine a reduced number of shift values that meet system requirements, and (3) given the shift values table, determine base values that meet system requirements.

For the first stage, the number of shifter blocks is set to some value N (step 80) and the table is seeded with optimum shift values for each segment (step 82). Since the number of shift values is unconstrained, the combination of slope elements that most Closely approximates the ideal slope for each segment when using N shifter blocks is chosen. Using ideal base values and the seeded table, the performance of the mapping circuit is simulated, e.g. calculated the SFDR assuming an ideal DAC, and evaluated against the system requirements (step 84). If the simulated SFDR is insufficient, the number N of shifter blocks is increased (step 86) and the steps repeated. Similarly, if the SFDR is too good, the number N is decremented (step 86) and the steps repeated. When a number of blocks are determined that provides the desired performance, the simulation moves to the next stage.

In the second stage, the seed table is pruned so that the number of shift values (including "0") in each block is no greater than a desired value (step 90). For example, assuming a data signal of 7 LSBs, each shifter block in the seed table could conceivably use all eight shift values from >>0 to >>7 for the optimal representation of the slopes for all of the segments. The pruning step might limit each shifter block to no more than four shift values. Consequently, the sum of the slope elements would be less accurate. Currently, pruning is done by hand in a fairly ad hoc approach but could be automated. For example, the designer will look at all of the shift values in the seed table for a particular shift block and notice that six of the eight possible values are used but of those two are used very seldom, say once each. The designer may replace those values with one of the other shift values for the block that would induce the least amount of error. The designer repeats this for each shifter block (table column) and successfully limits each block to no more than four shift values down from the original seven. The importance of this will become apparent when implementations of the shifter block are discussed in FIGS. 6 and 7 below. Note, table 70 shown in FIG. 4 has been pruned for a seed table having up to eight shift values per block to a table having no more than four shift values per block.

Using ideal base values and the pruned table, the performance of the mapping circuit is simulated, e.g. calculate the SFDR assuming an ideal DAC, and evaluated against the system requirements (step 92). If the simulated SFDR is insufficient, than either the constraint on the number of shift values is relaxed (step 94) or the number N of shifter blocks is increased (step 86) and the steps for stage one repeated. Similarly, if the SFDR is too good, the constraint on the number of shift values can be further tightened, e.g. no more than two (step 94) and the steps repeated. When a number of shift values is determined that provides the desired performance, the simulation moves to the final stage.

In the third stage, a segment counter is initialized (step 100), an initial base value is set to the ideal base value (step 102), and a base value counter is set (step 104). A loop is then entered in which a number (e.g. 2x+1) of base values around the ideal value are evaluated and the best one selected. More specifically, assuming "x" and "delta" are positive, the base value is increased by a max offset (step 106) and the mapping circuit is simulated to compute a SFRD (step 108). The algorithm checks to see if the final base value has been tested (step 110). If not, the base value counter is decremented (step 112), and the process repeated to evaluate another base value. If so, the base value with the best SFDR is selected (step 114). The segment counter is incremented (step 116) and the entire third stage repeated until a base value is assigned to the last segment (step 118).

At the end of all three stages, the mapping circuit is simulated using the pruned table and the actual base values (step 120). If the performance is satisfactory, the process is finished. If not, the base values can be adjusted (step 122) to achieve satisfactory performance. Alternately, the number of shifter blocks can be increased (step 86) or any constraint on the number of shift values can be relaxed (step 94).

The value of using a controller to down select from a segment number to a particular shift value, and further to down select to a particular shift value from a constrained set of values is found in the preferred implementation of the shifter blocks. In the preferred embodiment, each shifter block comprises a plurality of N-port multiplexers (one for each lsb) in which each input port corresponds to a different shift value. The multiplexers are configured to receive the remaining LSBs at their input ports down shifted from one multiplexer to the next to receive bit 6, bit 5 and so forth to bit 0 and, in response to a select signal from the controller, to pass the down shifted LSB at the selected input port to an output port. Each multiplexer selects a different lsb shifted by the same shift value so that together the multiplexers pass the remaining LSBs right shifted by the shift value associated with the selected input port. This is true whether the set includes all shift values, e.g. 0, >>1, >>2 . . . >>7 for an 8-port multiplexer or say 0, >>2, >>3, >>8 for a 4-port multiplexer. The number of input ports is dictated by the number of preset shift values required to accurately map all of the segments to meet system requirements.

Using narrow multiplexers is important to reducing the amount of chip space used and the power consumed by the mapping circuit. The use of the controller reduces the number of multiplexer input ports, as compared to Langlois, from the number of segments, e.g. 32, to the number of LSBs plus one, e.g. 8. Since multiplexers are sized in powers of two, an 8-port multiplexer would be used. By constraining the number of shift values, the multiplexers can be further reduced to 4 or even 2 ports. With 32 segments the difference is substantial, but with 64 or even 128 segments the difference in hardware resources would be very large. It is worth noting that since the number of multiplexer input ports is independent of the number of segments, if a particular DDFS implementation used a very small number of segments say four, the number of input ports may actually be larger than the number of segments. This is not a problem because the multiplexer is still narrow but as described above the hardware savings become significant when the number of segments is larger.

Figure 6A:
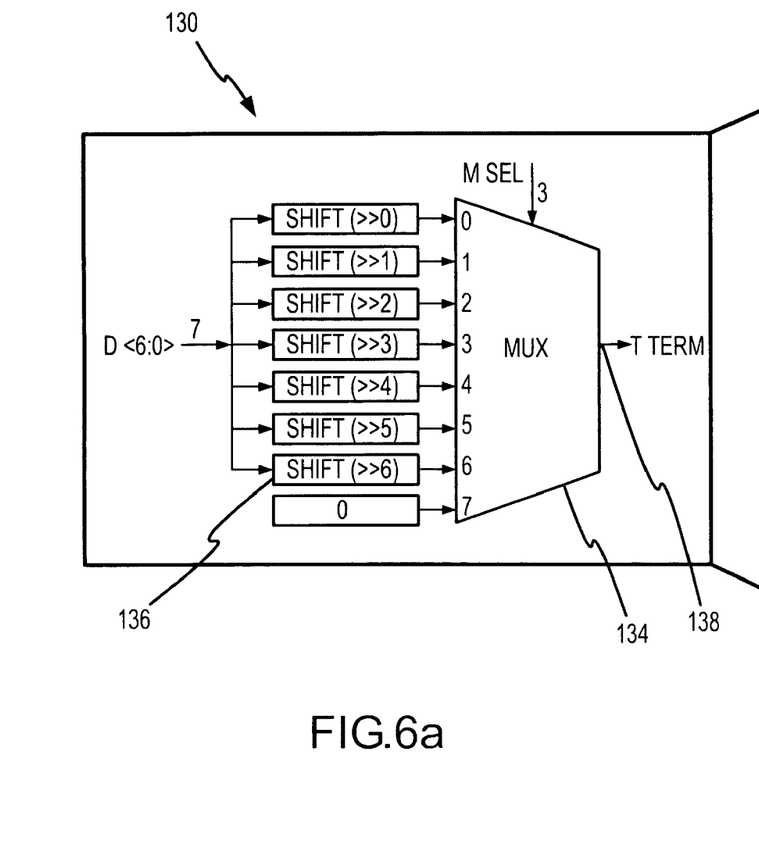
FIGS. 6a and 6b are a conceptual drawing and exemplary embodiment of an 8-port Multiplexer implementation of the shifter block.
Figure 6B:
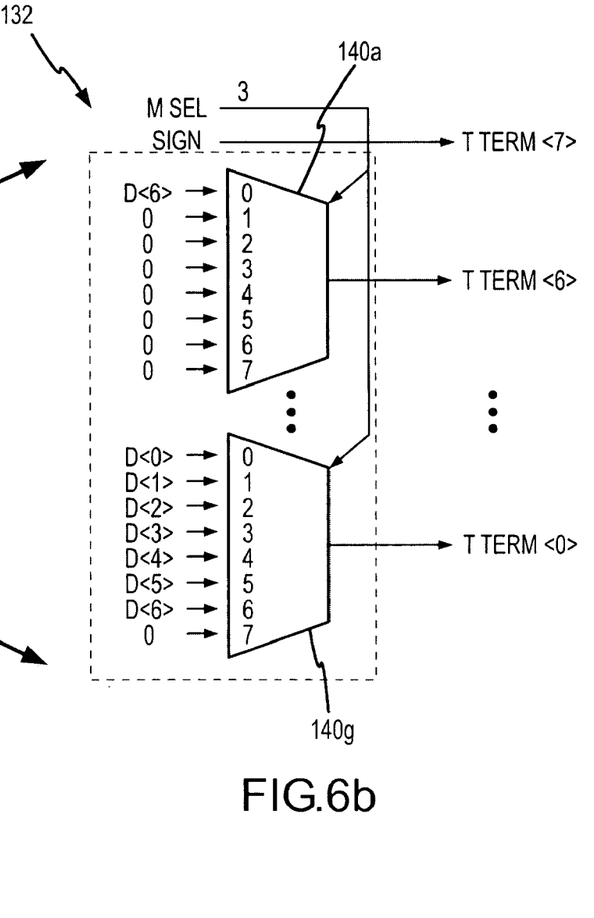

A conceptual implementation 130 and actual implementation 132 of the shifter blocks 64a-64d for an unconstrained seed table and a data signal of 7 LSBs are shown in FIGS. 6a-6b. Conceptually, the shifter block includes an 8-port Multiplexer 134 and shifters 136 at each of the input ports that shift the data signal by >>0, >>1, . . . >>6 or select a value "0", respectively. Multiplexer 134 is responsive to a select signal MSEL from the controller that selects the input port corresponding to the shift value specified by the table for that shifter block and the particular segment number. The data signal right shifted by the selected value is passed to the output port 138.

In the actual implementation, seven 8-port Multiplexers 140a-140g are configured to shift and select each bit of the data signal. Input port 0 corresponds to >>0, input port 1 correspond to >>1 and so forth. Multiplexer 140a maps the shifted data signal to the seventh or MSB (Tterm<6>) output by the shifter block. The seventh and MSB (D<6>) of the data signal is connected to input port 0. The remaining input ports all receive values of "0". If the selected shift value is >>0, the MSB D<6> of the data signal will be passed to the MSB Tterm<6> of the output. For any non-zero shift value, the MSB Tterm<6> is zero. Similarly, Multiplexer 140g maps the shifted data signal to the first or LSB (Tterm<0>). The first and LSB (D<0>) of the data signal is connected to input port 0, the second D<1> connected to input port 1 and so forth. If the selected shift value is >>0, the LSB D<0> of the data signal will be passed to the LSB Tterm<0> and if the shift is >>1, D<1> will be passed and so forth. The key to the implementation is that the input ports correspond to shift values, not segment numbers. As a result, the Multiplexer only requires enough input ports as there are possible shift values instead of the number of segments.

Figure 7A:
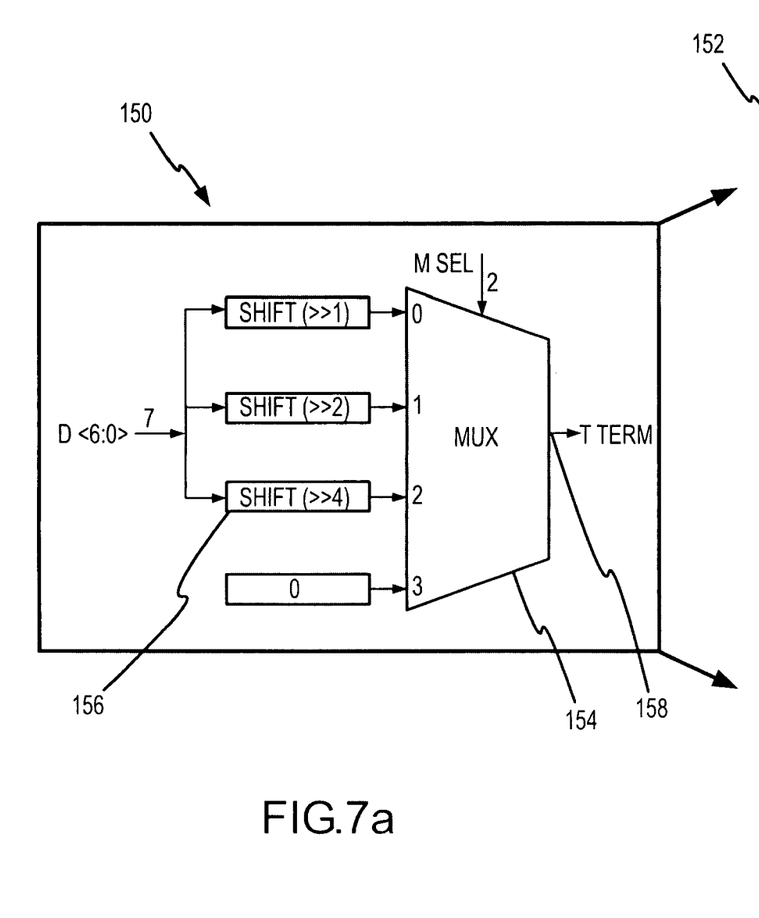
FIGS. 7a and 7b are a conceptual drawing and exemplary embodiment of a 4-port Multiplexer implementation of the shifter block.
Figure 7B:
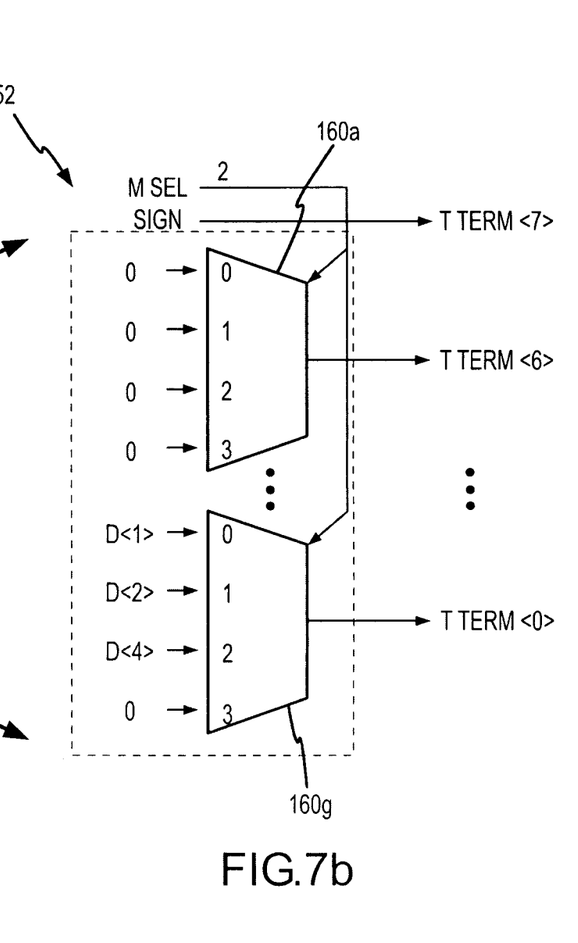

A conceptual implementation 150 and actual implementation 152 of shifter blocks 64b (column 2) for the constrained table 70 shown in FIG. 4 and a data signal of 7 LSBs are shown in FIGS. 7a-7b. Conceptually, the shifter block includes a 4-port Multiplexer 154 and shifters 156 at each of the input ports that shift the data signal by >>1, >>2, and >>4 or select a value "0", respectively. Multiplexer 154 is responsive to a select signal MSEL from the controller that selects the input port corresponding to the shift value specified by the table for that shifter block and the particular segment number. The data signal right shifted by the selected value is passed to the output port 158.

In the actual implementation, seven 4-port Multiplexers 160a-160g are configured to shift and select each bit of the data signal. Input port 0 corresponds to >>1, input port 1 correspond to >>2, input port 3 to >>4 and input port 4 to assign "0". Multiplexer 160a maps the shifted data signal to the seventh or MSB (Tterm<6>) output by the shifter block. In this case all of the input ports receive values of "0". Similarly, Multiplexer 160g maps the shifted data signal to the first or LSB (Tterm<0>). The second bit (D<1>) of the data signal is connected to input port 0, the third bit D<2> is connected to input port 1, the fifth bit D<5> is connected to input port 2 and a value "0" is assigned to input port 4. If the selected shift value is >>1, the second bit (D<1>) of the data signal will be passed to the LSB Tterm<0> and so forth. The key to the implementation is that the input ports correspond to the constrained set of preset shift values, not segment numbers. As a result, the Multiplexer only requires enough input ports as there are possible shift values, e.g. 4, instead of the number of segments 32.

In an embodiment, the NCO and DAC are implemented in a 0.35-μm SiGe BiCMOS process and operates with a 3.0V power supply. The die is directly mounted and wire bonded to a 6-layer printed circuit board. This DDFS achieves over 50 dBc SFDR for output frequencies up to Nyquist (850 MHz) when $f_{CLK}$=1.7 GHz while the mapping circuit achieves over 70 dB SFDR. Compared to the previously reported DDFS designs with DAC(s) (B. D. Yang et al., "An 800-MHz low-power direct digital frequency synthesizer with an on-chip D/A converter", IEEE J. Solid State Circuits, vol. 39, no. 5, pp. 761-774, 2005 and A. Edman et al., "A 0.8 um CMOS 350 MHz quadrature direct digital frequency synthesizer with integrated D/A converters" Symposium on VLSI Circuits Digest of Technical Papers, pp. 54-55, June 1998), this DDFS is working at more than twice the clock frequency and has SFDR more than 30 dB higher at high-output frequencies. The IC dissipates a core power of 3 W and power efficiency (power/$f_{MAX,CLK}$) is 1.76 mW/MHz at 3.0 V. The die area is 24 mm² including bonding pads and I/O circuits. The DAC core occupies 4.3 mm² within the die area.

For the same design parameters (e.g., 32 segments, 7 bits for linear segments, the same possible coefficient '$a_k$' selections, and so on), this linear segment computation occupies less area in the same technology compared to Langlois. It alleviates circuit complexity even more in designs with a larger number of segments.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A phase-to-amplitude sinusoidal mapping circuit using linear approximation, comprising:
    A base decoder that decodes a number of MSBs of a digital phase angle to generate a base value of a sinusoidal amplitude for the phase angle;
    A controller that maps the MSBs to a segment number in a quadrant of the sinusoid to select at least one signed shift value for that segment number;
    At least one shifter block that shifts the remaining LSBs of the phase angle by the corresponding shift value; and
    An adder that adds the at least one signed and shifted LSBs to the base value to provide an approximate sinusoidal amplitude for the phase angle.

2. The mapping circuit of claim 1, further comprising a plurality of shifter blocks that each shift the remaining LSBs by a different shift value.

3. The mapping circuit of claim 2, wherein each shifter block is configured to shift the LSBs by one of a plurality of preset shift values as selected by the controller.

4. The mapping circuit of claim 3, wherein the number of preset shift values is less than or equal to the number of LSBs plus one.

5. The mapping circuit of claim 4, wherein each shifter block comprises a plurality of N-port multiplexers in which each input port corresponds to a different preset shift value.

6. The mapping circuit of claim 5, wherein the N-port multiplexers are configured to receive the remaining LSBs at their respective input ports down shifted from one multiplexer to the next and, in response to a select, signal from the controller, to pass the down shifted LSB at the selected input port to an output port and together to pass the remaining LSBs right shifted by the shift value associated with the selected input port.

7. The mapping circuit of claim 1, wherein the at least one shifter block comprises a plurality of N-port multiplexers in which each input port corresponds to a different shift value, said multiplexers configured to receive the remaining LSBs at their respective input ports down shifted from one multiplexer to the next and, in response to a select signal from the controller, to pass the down shifted LSB at the selected input port to an output port and together to pass the remaining LSBs right shifted by the shift value associated with the selected input port.

8. The mapping circuit of claim 7, wherein the number N of input ports is at least a number of preset shift values supported by the shifter block for all segments and independent of the number of segments.

9. The mapping circuit of claim 8, wherein the number N is less than the number of segments.

10. The mapping circuit of claim 8, wherein the number N is less than or equal to the number of LSBs plus one.

11. The mapping circuit of claim 8, wherein the number of input ports N of the multiplexers is the same in each of the shifter blocks.

12. A phase-to-amplitude sinusoidal mapping circuit using linear approximation, comprising:
    A base decoder that decodes a number of MSBs of a digital phase angle to generate a base value of a sinusoidal amplitude for the phase angle;
    A controller that maps the MSBs to a select signal corresponding to a shift value and a sign;
    A shifter block comprising a plurality of N-port multiplexers in which each input port corresponds to a different shift value, said multiplexers configured to receive the remaining LSBs at their input ports down shifted from one multiplexer to the next and, in response to the select signal, to pass the down shifted LSB at the selected input port to an output port and together to pass the remaining LSBs right shifted by a shift value associated with the selected input port; and
    An adder that sums the shifted LSBs and the base value according to the sign to provide an approximate sinusoidal amplitude for the phase angle.

13. The mapping circuit of claim 12, wherein the circuit comprises a plurality of the shifter blocks that each shift the remaining LSBs by a different shift value.

14. The mapping circuit of claim 12, wherein the number N of input ports is at least a number of preset shift values supported by the shifter block for all segments and independent of the number of segments.

15. The mapping circuit of claim 14, wherein the number N is less than the number of segments.

16. A Direct Digital Frequency Synthesizer (DDFS), comprising:
    A phase accumulator that calculates digital phase angles from a signal representing a sinusoid function defined by a plurality of linear segments;
    A phase-to-amplitude mapping circuit including,
        A base decoder that decodes a number of MSBs of the phase angle to generate a base value of a sinusoidal amplitude for the phase angle;
        A controller that maps the MSBs to a segment number in the quadrant of the sinusoid to select a plurality of signed shift value for that segment number;
        A plurality of shifter blocks that shift the remaining LSBs of the phase angle by the corresponding shift values; and
        An adder that adds the plurality of signed and shifted LSBs to the base value to provide an approximate sinusoidal amplitude for the phase angle; and
    A digital-to-analog converter that receives digital information and converts the approximate sinusoidal amplitude to an analog value.

17. The mapping circuit of claim 16, wherein each said shifter block comprises a plurality of multi-port multiplexers in which each input port corresponds to a different shift value, said multiplexers configured to receive the remaining LSBs at their respective input ports down shifted from one multiplexer to the next and, in response to a select signal from the controller, to pass the down shifted LSB at the selected input port to an output port and together to pass the remaining LSBs right shifted by the shift value associated with the selected input port.

18. The mapping circuit of claim 17, wherein the number of input ports is at least the number of preset shift values supported by the shifter block for all segments and independent of the number of segments.

19. The mapping circuit of claim 18, wherein the number of ports is less than the number of segments.

20. The mapping circuit of claim 18, wherein the number of input ports for the multiplexers is the same in each of the shifter blocks.

21. A method of direct digital frequency synthesis, comprising:
    calculating digital phase angles from a signal representing a sinusoid function defined by a plurality of linear segments;
    decoding a number of MSBs of each said digital phase angle to generate a base value of a sinusoidal amplitude for the phase angle;
    mapping the MSBs to a segment number in a quadrant of the sinusoid to select at least one signed shift value for that segment number;
    shifting the remaining LSBs of the digital phase angle by the at least one shift value;
    adding at least one signed and shifted LSBs to the base value to provide an approximate sinusoidal amplitude for each said phase angle; and
    converting the sinusoidal amplitude for each said phase angle to an analog value to synthesize an analog signal.

22. The method of claim 21, wherein the remaining LSBs are shifted by a plurality of different shift values selected for the segment number and added to the base value.

23. The method of claim 21, wherein each bit of the remaining LSBs is shifted by a plurality of preset values and input to a multiplexer that selects the input corresponding to the selected shift value so that together the multiplexers shift the remaining LSBs by the shift value.

* * * * *

UNITED STATES PATENT AND TRADEMARK OFFICE
CERTIFICATE OF CORRECTION

PATENT NO. : 7,580,964 B2  Page 1 of 1
APPLICATION NO. : 11/339933
DATED : August 25, 2009
INVENTOR(S) : Edward T. Merlo, Kwang-Hyun Baek and Myung-Jun Choe It is certified that error appears in the above-identified patent and that said Letters Patent is hereby corrected as shown below:

Title page, item [73] assignee delete "Teledyne Technologies, Incorporated" and insert --Teledyne Licensing, LLC--.

Signed and Sealed this

Twenty-second Day of December, 2009

David J. Kappos
*Director of the United States Patent and Trademark Office*